(12) United States Patent
Boulanger et al.

(10) Patent No.: US 7,487,928 B2
(45) Date of Patent: Feb. 10, 2009

(54) GRINDING BALLS AND THEIR MANUFACTURING METHOD

(75) Inventors: Louis Boulanger, Tiege (BE); Stéphane Desiles, Angleur (BE)

(73) Assignee: Magotteaux International S.A. (BE)

( * ) Notice: Subject to any disclaimer, the term of this patent is extended or adjusted under 35 U.S.C. 154(b) by 394 days.

(21) Appl. No.: 10/587,125

(22) PCT Filed: Feb. 7, 2005

(86) PCT No.: PCT/BE2005/000016

§ 371 (c)(1), (2), (4) Date: Jul. 24, 2006

(87) PCT Pub. No.: WO2005/075375

PCT Pub. Date: Aug. 18, 2005

(65) Prior Publication Data

US 2008/0245912 A1    Oct. 9, 2008

(30) Foreign Application Priority Data

Feb. 10, 2004    (EP) .................................. 04447035

(51) Int. Cl.
*B02C 25/00*    (2006.01)
*B02C 17/14*    (2006.01)

(52) U.S. Cl. ......................................... 241/30; 241/184

(58) Field of Classification Search ................... 241/30, 241/184; 29/899
See application file for complete search history.

(56) References Cited

U.S. PATENT DOCUMENTS

| | | | |
|---|---|---|---|
| 3,486,706 A | 12/1969 | Weyand | |
| 3,679,383 A | 7/1972 | Hagio et al. | |
| 4,343,751 A | 8/1982 | Kumar | |
| 4,430,279 A | 2/1984 | Hagio et al. | |
| 5,502,012 A | 3/1996 | Bert et al. | |
| 6,284,694 B1 * | 9/2001 | Moeltgen et al. | 501/127 |
| 6,509,287 B2 | 1/2003 | Boussant-Roux et al. | |
| 6,616,873 B1 | 9/2003 | Duraiswami et al. | |
| 6,634,576 B2 * | 10/2003 | Verhoff et al. | 241/21 |

FOREIGN PATENT DOCUMENTS

| | | |
|---|---|---|
| DE | 42 01 615 A1 | 7/1993 |
| EP | 0811 586 A2 | 12/1997 |
| EP | 0 662 461 B1 | 7/1999 |
| EP | 1 167 620 A1 | 1/2002 |

OTHER PUBLICATIONS

International Preliminary Report on Patentability (translation), International Application No. PCT/BE2005/000016, date of actual completion of the corresponding international search May 2, 2005, date of actual mailing of the corresponding international search report May 12, 2005, 4 pages, European Patent Office.

International Search Report, International Application No. PCT/BE2005/000016, date of actual completion of the international search May 2, 2005, date of actual mailing of the international search report Dec. 5, 2005, 3 pages.

* cited by examiner

*Primary Examiner*—Faye Francis
(74) *Attorney, Agent, or Firm*—Reinhart Boerner Van Deuren P.C.

(57) ABSTRACT

The present invention relates to grinding balls made of fritted ceramic comprising a compound of alumina silicate ($\alpha Al_2O_3 \cdot \beta SiO_2$) and in particular mullite ($3Al_2O_3 \cdot 2SiO_2$), zirconia ($ZrO_2$) and alumina ($Al_2O_3$).

15 Claims, 10 Drawing Sheets

GRINDING BALLS AND THEIR MANUFACTURING METHOD

CROSS-REFERENCE TO RELATED PATENT APPLICATION

This patent application is the National Stage of International Application No. PCT/BE2005/000016 filed Feb. 7, 2005, which claims the benefit of EP 04447035.9 filed Feb. 10, 2004, the teachings and disclosure of which are hereby incorporated in their entireties by reference thereto.

FIELD OF THE INVENTION

The present invention relates to the grinding of mineral or organic substances, and in particular to spheroid fritted-ceramic balls used in agitator mills, of the attrition type or others, for the reduction, dispersion and regeneration of particles in a dry and/or wet process.

STATE OF THE ART AND INTRODUCTION

The equipment and methods of fine grinding and the dispersion with dry and wet processes are well known to those skilled in the art and developed in industries such as:
- the mineral industry with the fine grinding of pre-ground particles by means of traditional methods,
- the industries of paint, ink, lacquer and agrochemical compounds as well as for the dispersion and homogenisation of liquids and of varied solid constituents.

In most cases, these equipment and methods use dispersion or grinding materials of an essentially spherical shape and of reduced diameters (generally less than 10 mm).

Fine and ultra-fine grinding has recently become an essential development path in the mining industries, with the need to supply economical grinding materials.

The agitator mill can be described as follows: it comprises a cylindrical chamber positioned horizontally or vertically and containing small balls with a diameter of 0.5 mm to 12 mm depending on the desired fineness for the finished product. An axis with discs rotates in this chamber. These discs transmit the motion to the grinding medium and to the material to be ground. The motion of the whole assembly allows the dispersion of the material to be ground between the grinding balls that have the function of reducing said material to a predetermined fineness. The particle size obtained is thus a function of the energy put into the machine.

This grinding method can be achieved continuously in wet and dry processes, with the supply and discharge of the material to be ground, or in batches, i.e. in an entirely closed cylindrical chamber.

The grinding media themselves are clearly subjected to wear and their selection will depend on the following criteria:
- chemical inertness relative to the ground or dispersed products,
- resistance to mechanical impacts,
- resistance to wear,
- wear caused on the internal equipment of the mill or of the disperser,
- its density, a higher density giving good grinding performance,
- the absence of open porosity, leading to rapid wear of the grinding balls,
- an acceptable spherical shape.

A limited number of media used in agitator mills or in dispersers can be found on the market:
- sand with rounded grains (quartz, zircon),
- glass balls,
- metal balls,
- fused-ceramic balls (electro-fused),
- fritted-ceramic balls.

Sand with rounded grains is a natural and cheap product. Its poor resistance to mechanical impacts, its low density, its variations in quality (inconsistency of deposits), its abrasiveness towards the internal equipment of agitation mills and dispersers constitute its limitations in application.

Glass balls that are widely used to overcome the drawbacks of sand with rounded grains turn out to be less effective in grinding or dispersion applications that require balls with high mechanical resistance and high wear resistance. Their low density of 2.5 $g/cm^3$ is also a feature that limits their use when grinding efficiency is an important element of the process.

Metal balls turn out less effective for the following reasons:
- they are insufficiently chemically inert relative to the ground or dispersed products,
- their excessively high density entails high energy consumption and high heating level of the internal equipment of the mills/agitators.

Ceramic balls on the other hand have better mechanical resistance than glass balls, a density that is intermediate between that of glass balls and that of metal balls as well as good chemical inertness relative to the ground or dispersed products.

Depending on the manufacturing methods, ceramic balls are classified into two groups:
- fused-ceramic balls, obtained by the fusion of ceramic compounds at very high temperature (+/−2000° C.) and solidified in the form of droplets,
- fritted-ceramic balls, obtained by cold shaping of the ceramic compounds and consolidation of the latter by fritting at high temperature (+/−1500° C.).

Depending on the ceramic compounds shaped, the fritted-ceramic balls are classified into four groups:
- balls made of alumina ($Al_2O_3$ content ≧90%),
- balls made of alumina silicate (mullite or others),
- balls made of alumina-zirconia (85 to 95% $Al_2O_3$-15 to 5% $ZrO_2$),
- balls made of zirconia, stabilised or partially stabilised by means of yttrium, cerium or magnesium oxide, among others.

The compositions of mullite/zirconia as well as those of mullite/alumina/zirconia have generally been studied in the context of fireproof bricks to be used in glass furnaces.

In their publication "High temperature mechanical properties of reaction-sintered mullite/zirconia and mullite/alumina/zirconia composites" (Journal of Materials Science 20 (1985), pp. 2533-2540), G. Orange and F. Cambier studied the break resistance of such compounds as well as their impact resistance at high temperature (1000° C.) for using these compounds in structural applications such as glass furnaces.

The problem with grinding balls is however very different. These balls must be much smoother than fireproof bricks in as much as the mere presence of angles on the grinding media may reduce by 50% the useful life of the internal equipment of attrition mills, leading to maintenance costs that make the use of very rough grinding media impossible.

The surface finish of grinding balls is thus very important since it directly affects the internal wear of the equipment and the grinding quality. Said surface finish is also directly affected by the chemical composition and the manufacturing method of said balls.

Grinding balls in electrically fused alumina and zirconia are disclosed in the American patents U.S. Pat. No. 3,486,706 and U.S. Pat. No. 5,502,012, respectively. These documents claim specific vitreous phases.

Patent application EP-0 662 461 A1 discloses balls of ceramic material formed by the fusion of a mixture of zirconia and silica and studies the effect of the presence of yttrium and cerium oxides.

Document EP 1 167 320 A1 describes low-cost products made of alumina-zirconia-silica, melted and cast into blocks, to be used in glass furnace regenerators or in superstructures.

All grinding balls comprising silica, alumina or zirconia have the common feature that they have been produced by fusion, which requires access to temperatures above 2000° C., which is technically difficult and hence expensive. By contrast, none of these documents discloses grinding balls made of fritted ceramic, comprising at the same time silica, alumina and zirconia. This process can be achieved at about 1500° C., which is much easier in terms of technology and hence less expensive.

AIMS OF THE INVENTION

The present invention aims to provide grinding balls made of fritted ceramic with a particular composition having high durability and good resistance to cold wear, to be used in grinding mills for mineral or organic substances. In addition, it aims to provide a method for manufacturing such balls.

SUMMARY AND CHARACTERISTIC ELEMENTS OF THE INVENTION

The present invention discloses grinding balls made of fritted ceramic comprising the following compounds (in weight %):
18 to 50% mullite ($3Al_2O_3.2SiO_2$)
9 to 25% zirconia ($ZrO_2+HfO_2$) stabilised by 0.5 to 3% of rare earth oxide
25 to 72% alumina ($Al_2O_3$).

According to preferred embodiments, the invention comprises one or several of the following characteristics:
said compounds are mainly obtained from raw materials comprising zircon ($ZrSiO_4$) and alumina ($Al_2O_3$);
said ceramic further comprises 1 to 5% by weight of oxides selected from the group of $Na_2O$, MgO, CaO and BaO;
said zirconia is stabilised by 0.5 to 3% by weight of $Y_2O_3$;
the chemical analysis (X fluorescence, ICP plasma spectrometer) of said balls moreover shows the presence of the following oxides (in weight %):
9 to 25% $ZrO_2+HfO_2$,
0.5 to 3% $Y_2O_3$,
5 to 12% $SiO_2$,
60 to 85% $Al_2O_3$ with a $ZrO_2/SiO_2$ ratio greater than or equal to 2;
the grinding balls have a diameter between 0.1 mm and 100 mm, preferably between 0.5 mm and 50 mm, and in particular preferably between 0.5 mm and 10 mm.

The present invention further discloses a method for manufacturing grinding balls made of fritted ceramic, comprising the following steps:
mixing and/or grinding raw materials by dry and/or wet process so as to form a slurry with possible addition of binding agents and/or organic surfactants;
passing said slurry through a granulation means or process;
selecting by sieving the balls obtained with the return to the mixer of the balls having unsatisfactory grain size via a possible drying and/or grinding step;
drying the balls of satisfactory grain size;
fritting the balls of satisfactory grain size between 1400° C. and 1600° C. followed by a packaging step.

Moreover, the invention specifies that, during the selection step, the granulation means comprise fluidised-bed granulators and granulation discs.

The invention also shows that water fogging occurs on the granulation disc during the selection step in order to obtain grinding balls before fritting comprising 18 to 22% water.

Moreover, the granules may also be obtained by gelation methods or by injection moulding methods.

The invention also specifies that said organic binding agents are chosen from the group of polysaccharides, thermoplastic polymers, thermosetting polymers or polymers based on aqueous or organic solvents.

As an advantage, said surfactants are chosen from the group of carboxylic acids such as stearic acid or oleic acid and/or polyelectrolytes such as ammonium polymethylacrylate.

Moreover, the invention discloses the use of the grinding balls made of fritted ceramic according to claim 1 for grinding mineral or organic materials.

SHORT DESCRIPTION OF THE FIGURES

DETAILED DESCRIPTION OF THE INVENTION

Figure 1:
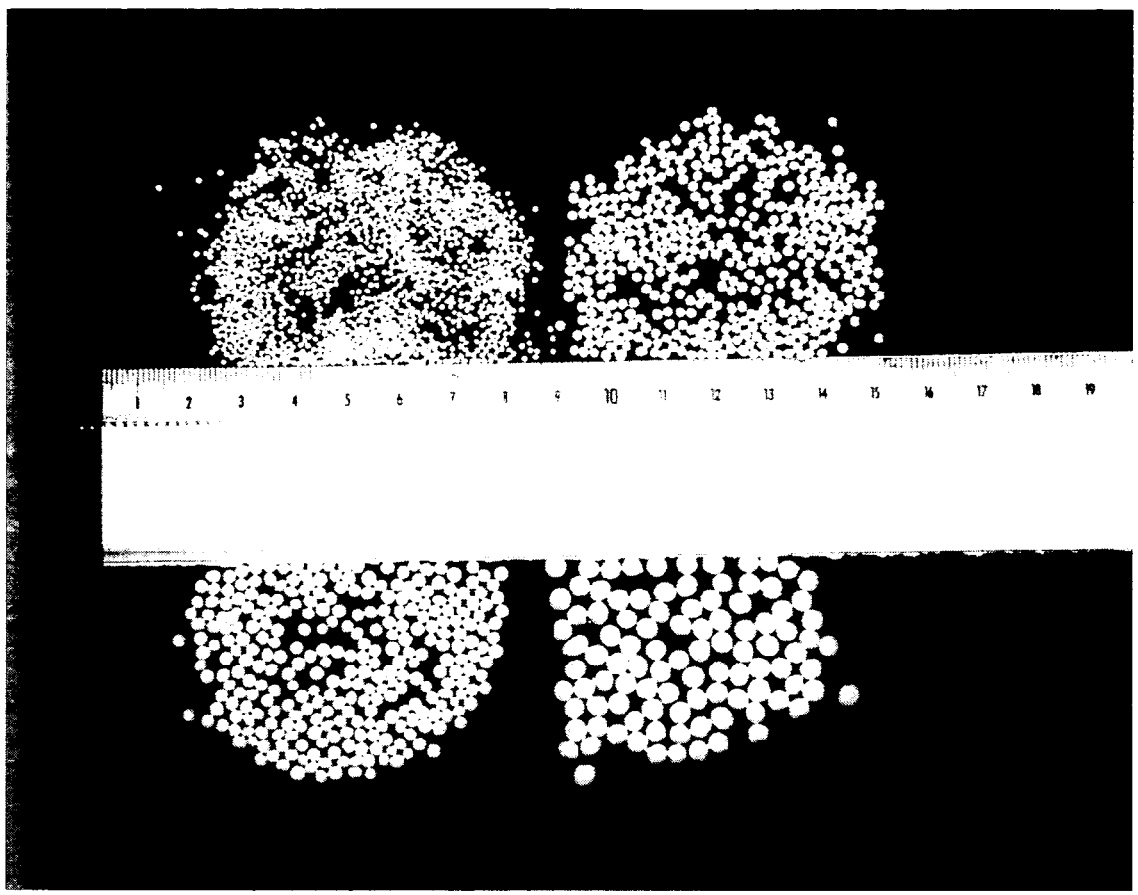
FIG. 1 shows an illustration of the balls according to the present invention with different grain sizes.

The invention relates to balls made of fritted ceramic comprising alumina-zirconia-alumina silicate, and in particular alumina-zirconia-mullite. The quality of these balls is higher than that of balls made of alumina, of alumina silicate or of alumina-zirconia, and their cost is significantly lower than that of zirconia balls, which are very expensive and used in particular as grinding and/or dispersion medium.

More precisely, the invention relates to balls made of fritted ceramic with the following chemical composition, by weight %:
5 to 40% $ZrO_2+HfO_2$, preferably between 9 and 25%,
0.1 to 10% $Y_2O_3$, preferably between 0.5 and 3%,
0.5 to 20% $SiO_2$, preferably between 5 and 12%,
40 to 90% $Al_2O_3$ preferably between 60 and 85%, with a $ZrO_2/SiO_2$ ratio greater than or equal to 2, preferably equal to 2.

0 to 5% of optional oxides ($Na_2O$, CaO, MgO, Bao, ...).

These balls may be formed by shaping from a slurry and/or a paste of ceramic oxides, dried and fritted at temperatures between 1400° C. and 1700° C., preferably between 1500° C. and 1600° C.

In the following description, where $ZrO_2$ (zirconia) is mentioned, the total of ($ZrO_2+HfO_2$) is to be taken into account. Indeed, some $HfO_2$, that is chemically inseparable from $ZrO_2$ and has similar properties, is always present in addition to $ZrO_2$, which is well known to those skilled in the art.

The invention is based on the dissociation reaction of zircon at high temperature in the presence of alumina. This reaction is also well known to those skilled in the art:

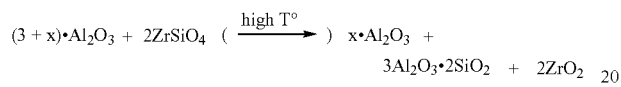

$$(3+x)\cdot Al_2O_3 + 2ZrSiO_4 \xrightarrow{high\ T°} x\cdot Al_2O_3 + 3Al_2O_3\cdot 2SiO_2 + 2ZrO_2$$

Varying x allows to adjust the relative volume proportions of alumina ($Al_2O_3$) (if $x \neq 0$), of alumina silicate in general and of mullite ($3Al_2O_3.2SiO_2$) in particular and of zirconia ($ZrO_2$), and thus to modify the properties of the final fritted ceramic composite such as hardness, durability and wear resistance.

The reaction at high temperature between zircon and alumina allows to obtain, by fritting pulverulent powders, very homogeneous composites, the synthesised phases of which are finely dispersed.

In a preferred embodiment of the invention, yttrium oxide ($Y_2O_3$) is added to the basic reagent of the preceding reaction, which allows to stabilise the crystallographic forms (cubic or tetragonal) of zirconia obtained at high temperature.

Zirconia remains mainly in tetragonal and sometimes in cubic shape in low proportions. These states depend on the amount of $Y_2O_3$ introduced. The tetragonal form is the densest of the three allotropic variants of zirconia: density of 6.1 g/cc versus 5.9 g/cc for zirconia in the cubic shape and 5.8 g/cc for zirconia in the monoclinic shape.

The tetragonal shape also gives a mechanical reinforcement effect to the matrix in which it is located. The total quantity of $Y_2O_3$, i.e. the portion entering the zirconia in order to stabilise it and the excess portion entering the composition of the silicate phase (mullite), leads to the production of denser balls with greater resistance to high impact forces and to wear.

Stabilisation of the zirconia also allows to improve the durability of the composite and to increase the dissociation speed of zircon, hence to reduce the temperature or the duration of fritting. This reduction in the temperature or duration of fritting allows to obtain a finer microstructure which is a major advantage in terms of wear resistance.

The dry ceramic ingredients of the balls of this invention are intimately mixed in a mixer, some water may possibly be added to the mixture, for example in order to obtain a pasty consistency or in order to form a slurry.

The mixed constituents, particularly in a dry process, may be transformed in spheres by means of a rotating pelletising disc or of a granulation disc. The powder of the ceramic ingredients turns into spheres by fogging of water with one or several organic binding agents added, on the rotary bed of the solid components. Fogging is adjusted so that the balls coming out of the pelletising disc comprise between 18 and 22% by weight of water.

Description of the Method of the Invention

The pelletisation method for obtaining balls can be diagrammatically represented as follows:

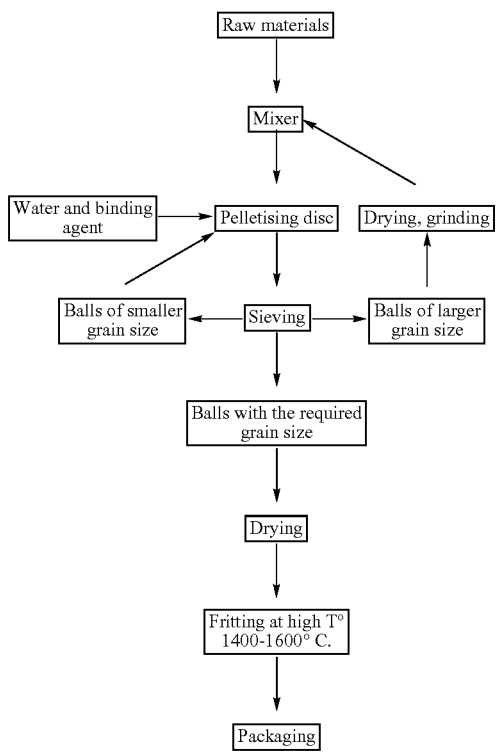

After the spheres are formed, they undergo a sieving process according to three grain size fractions:

a) the fraction with the desired grain size where the balls formed follow the manufacturing method through to the end;

b) the fraction with a grain size lower than that desired where the balls formed are returned to the pelletising disc in order to continue growing;

c) the fraction with a grain size greater than that desired where the balls formed are dried, pulverised and sent back to the mixer.

The fraction with the desired grain size (a) is dried in a conventional drying oven at a temperature of about 110° C. until the balls have a humidity level lower than 1% by weight.

The dried balls are then loaded into a fritting oven. The balls are fritted at a temperature between 1400° C. and 1600° C. according to a well-defined heating speed programme.

After fritting and cooling of the oven, the balls are conditioned in their packaging and are ready for dispatch.

Granulation by a fluidised bed dryer is shown in the following diagram:

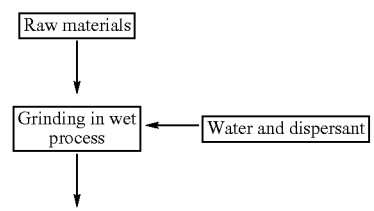

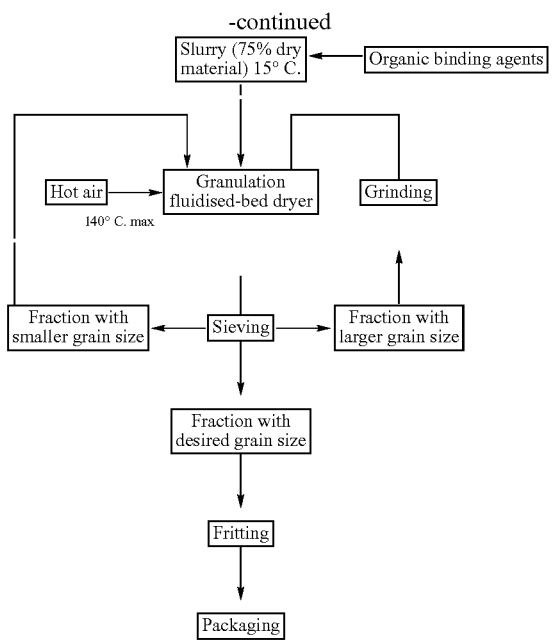

The ceramic ingredients that make up the balls of this invention with water and a dispersant added, are finely ground in a proportion of dry material within the range of 50 to 75%. After grinding, the extracted slurry receives organic binding agents (5 to 7%) and is finely mixed.

The slurry is injected at room temperature through injectors into a granulation fluidised-bed dryer where it comes into contact with the fluidised solid particles (seeds) having the same composition as that of the invention.

The hot air (140° C. max.) entering the dryer evaporates the water contained in the slurry, thus causing the deposition of the dry materials on the seeds. The successive depositions of dry material make the granules grow in layers and transform them into balls. Once the balls reach the desired size, they are removed from the dryer.

After extraction from the dryer, the balls undergo a sieving operation:

a) the balls with a smaller particle size than that desired go back into the dryer in order to continue their growth in it;
b) the balls with a larger particle size than that desired undergo a grinding operation and then go back into the dryer in order to serve as seeds for future balls;
c) the balls with the desired particle size follow the process (fritting at high temperature, packaging) to its end as in the process at Point A.

Other Manufacturing Methods

Shaping of the balls by gelation reaction:
  production of a slurry comprising between 50 and 75% dry materials, from the ceramic ingredients making up the balls of this invention with water and a dispersant added.
    addition to the slurry of a natural polysaccharide: 0.5 to 3% relative to the concentration of dry materials.
    gelation by flow, drop by drop, of the slurry through capillaries of different diameters in an aqueous solution comprising polyvalent cations.
    separation of the balls formed from the aqueous solution, washing of the balls in water, drying and fritting at high temperature.

Shaping of the balls by the injection moulding process:
  production of a suspension from the ceramic ingredients making up the balls of this invention with binding agents (waxes, polymers) and surfactants (carboxylic acid, for example stearic acid, oleic acid, . . . ) added.
  heating of this suspension to ±160° C. and injection of same into the impressions of the balls made in a metal mould, previously heated between 40 and 60° C.
  after solidification of the balls formed, extraction of these from the mould, unbinding of the binding agents according to a well-defined thermal treatment and fritting of the balls at high temperature.

Performance Tests in Laboratory Attrition Mills

The performance of the balls of the invention (alumina-zirconia-mullite) by comparison with alumina balls (A and B), alumina-zirconia balls (G and H), ceried zirconia (80% $ZrO_2$-20% $CeO_2$, in weight) (C and D), zirconia balls stabilised or partially stabilised with yttrium oxide (F), zirconia-silica balls produced by electrofusion (E).

1. Test Conditions a and b 1.1 Attrition Mill Netzsch-LM4 a) grinding by recirculation of an alumina slurry with 60% by weight of dry material by weight and 40% water: the grinding circuit is shown in FIG. 2.

Figure 2:
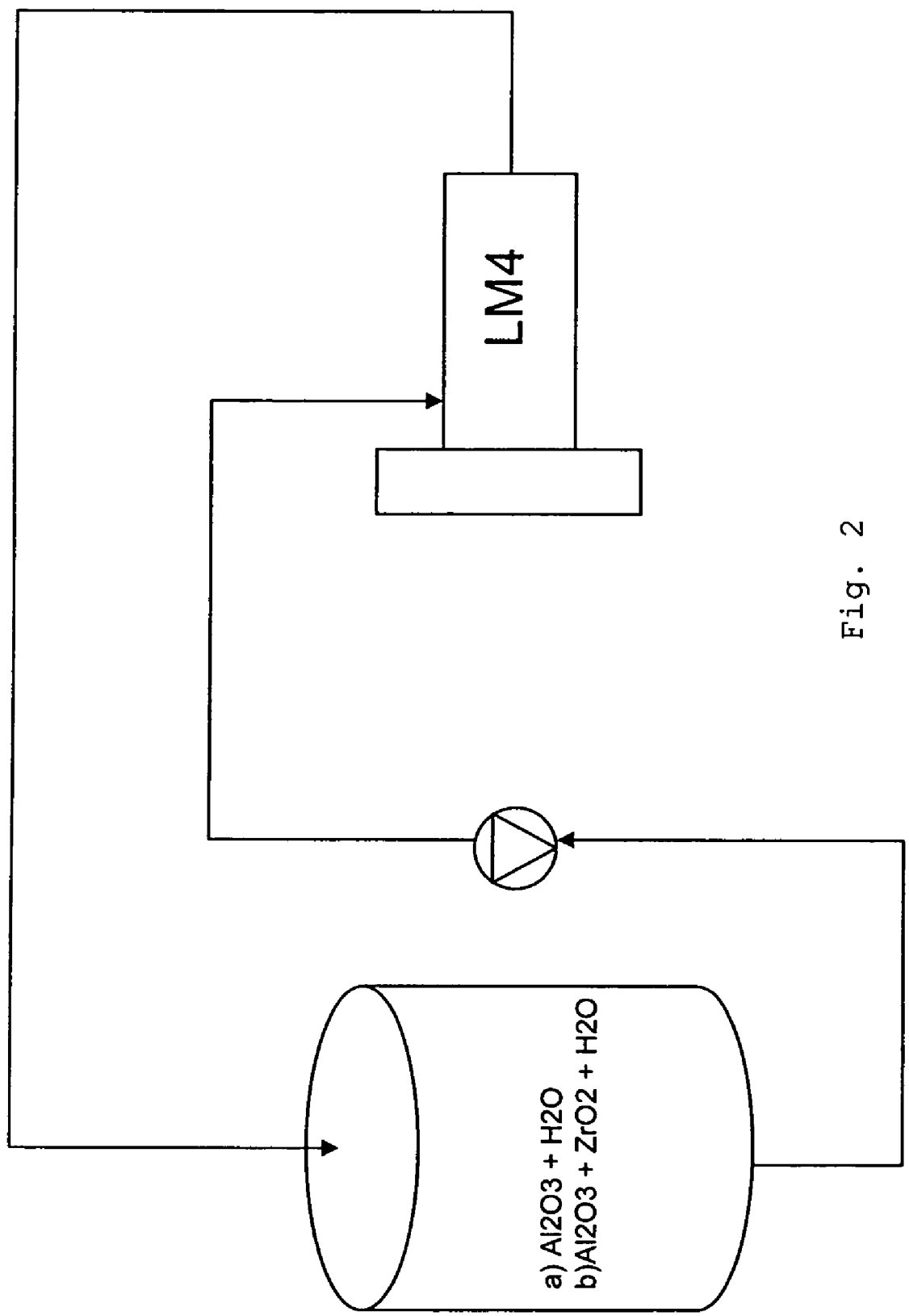
FIG. 2 shows a grinding scheme allowing to test the performance of the balls of the invention and to compare them to the performance of the balls of the prior art.

| | |
|---|---|
| Quantity of ground slurry (L) | 18 |
| Start particle size of slurry $d_{50}$ (μm) | 29.9 |
| Weight of alumina (kg) | 19.6 |
| Weight of water (kg) | 13.1 |
| Weight of disperser (kg) Dolapix C64 | 0.2 |
| Total weight of slurry (kg) | 32.9 |
| Useful volume of grinding chamber ML4 (L) | 4.6 |
| Load of grinding balls -> % volume of the chamber | 70 |
| Initial weight of the ball load (kg) | = poured density of balls × (4.6 × 0.70) |
| Output of slurry (kg/h) | 575 |
| Rotation speed of attrition mill (RPM) | 2100 | b) grinding by recirculation of a slurry with 60% of dry materials (30% by volume of alumina and 70% by volume of zirconia) and 40% of water: grinding circuit (see FIG. 2).

| | |
|---|---|
| Quantity of ground slurry (L) | 28.5 |
| Start particle size of slurry d50 (μm) | 1.25 |
| Weight of dry materials (kg) | 32.7 |
| Weight of water (kg) | 22.1 |
| Weight of disperser (kg) Dolapix C64 | 0.3 |
| Total weight of slurry (kg) | 55.2 |
| Useful volume of grinding chamber ML4 (L) | 4.6 |
| Load of grinding balls -> % volume of the chamber | 82 |
| Initial weight of the ball load (kg) | = poured density of balls × (4.6 × 0.82) |
| Output of slurry (kg/h) | 575 |
| Rotation speed of attrition mill (RPM) | 2000 |

1.2 Samples of Tested Grinding Materials

| Sample | Composition | Density | Cost* | Disclosure |
|---|---|---|---|---|
| A | 94% $Al_2O_3$ | 3.64 | 100 | Market |
| B | 90% $Al_2O_3$ | 3.61 | 100 | Market |
| C | 80% $ZrO_2$ - 20% $CeO_2$ | 6.24 | 600-700 | Market |
| D | 80% $ZrO_2$ - 20% $CeO_2$ | 6.24 | 600-700 | Market |

-continued

| Sample | Composition | Density | Cost* | Disclosure |
|---|---|---|---|---|
| E | 68% $ZrO_2$ - 31% $SiO_2$ | 3.84 | 80-80 | Market |
| F | 95% $ZrO_2$ - 5% $Y_2O_3$ | 6.10 | 1000 | Market |
| G | 90% $Al_2O_3$ - 10% $ZrO_2$ | 4.07 | 150-160 | Market |
| H | 70% $Al_2O_3$ - 30% $ZrO_2$ | 4.40 | 270-280 | EP0811586A |
| Balls of the invention | 18-50% ($3Al_2O_3 \cdot 2SiO_2$) 9-25% ($ZrO_2 + HfO_2$) 25-72% ($Al_2O_3$) | 3.88 | 100 | EP0811586A |

*relative cost of raw material – balls of the invention at value 100

1.3 Methodology and Performance Criteria

The slurries are ground in a Netzsch-type attrition mill according to the grinding circuit described in FIG. 2. For each sample of grinding materials, a slurry is ground until a similar particle size in obtained. During each grinding cycle, at regular interval (for example, every hour), slurry samples are taken from the circuit. The particle size analysis of these samples allows to follow the evolution of the size of the ground particles as a function of the grinding time and of the energy consumed by the attrition mill. These data allow to determine the equation of the curves of the enclosed FIGS. 3 to 10 for each tested grinding material. The quantity of each sample of grinding material to be put in the attrition mill is precisely determined and weighted in order to occupy a constant volume of the grinding chamber. This initial weight ($W_{in.}$) of each grinding load is recorded. At the end of each grinding cycle, the chamber of the attrition mill is emptied and the grinding load is again precisely weighted in order to determine the final weight ($W_{fin.}$).

For each sample of tested grinding materials, parameters integrated into the following equations are taken into consideration:
- the equation of the evolution curve of the slurry fineness according to the grinding time,
- the equation of the evolution curve of the slurry fineness according to the energy consumed by the attrition mill,
- the recordal of the initial weight ($W_{in.}$) and of the final weight ($W_{fin.}$) of the balls in the attrition mill,
- the cost of raw materials.

These equations will allow to compare the samples tested relative to the balls of the invention as regards the wear resistance, grinding efficiency and savings for the user in the following way:

a) Wear Performance:
   wear of the balls U (gr/kWh):
   $U = (W_{in.} - W_{fin.})/Ce$.
   The loss in weight of the balls in the attrition mill divided by the energy consumed (Ce) by the attrition mill allows thus to quantify the actual wear for each sample of balls tested.
   Being $W_s$: wear of the samples of grinding materials
   $W_b$: wear of the balls of the invention
   Wear Performance = $W_s/W_b$
   A ratio of wear $\geq 1$ indicates that the sample considered wears more than the balls of the invention.

b) Grinding Efficiency
   time performance
   The equation of the evolution curve of the slurry fineness according to the grinding time allows to quantify the time required to obtain a determined slurry fineness (d50). D50 (µm) being the average particle diameter of the slurry.
   Being $T_s$: grinding time required for the sample tested to obtain d50
   $T_b$: grinding time required for the balls of the invention to obtain d50.
   Time performance = $T_s/T_b$
   A grinding time ratio >1 indicates that the sample considered will monopolize the attrition mill more than the balls of the invention to do the same work.
   energy consumption performance
   The equation of the evolution curve of the slurry fineness according to the energy consumed by the attrition mill allows to quantify the energy consumed by the attrition mill to obtain a determined slurry fineness (d50).
   Being $E_s$: energy required for the sample tested to obtain d50
   $E_b$: energy required for the balls of the invention to obtain d50
   Energy consumption performance = $E_s/E_b$
   An energy ratio >1 indicates that the sample considered consumes more energy than the balls of the invention to do the same work.
   saving index (S)
   For each sample, the value ($X_s$) hereunder is calculated:
   $X_s = E_s \times W_s \times C_r$
   Being $E_s$: specific energy to obtain a determined fineness of the ground product
   $W_b$: wear of the balls
   $C_r$: relative cost of raw materials
   The value ($X_e$) evaluates the production costs for the user of grinding materials.
   Saving index: $S = X_s/X_b$
   Being $X_e$: production costs for the use of sample balls
   $X_b$: same of use of balls of the invention
   Thus, if C>1, the sample concerned is less economical for the user than the balls of the invention.

2. Results 2.1 Balls of the Invention Relative to the Alumina Balls (A and B)

According to the test conditions 1.1 a) identical for each quality of tested balls.

Diameter of Tested Balls: 2 mm

Final particle size of the desired slurry: $d_{50}$ +/− 0.85 µm.

a) Wear Performance

Figure 3:
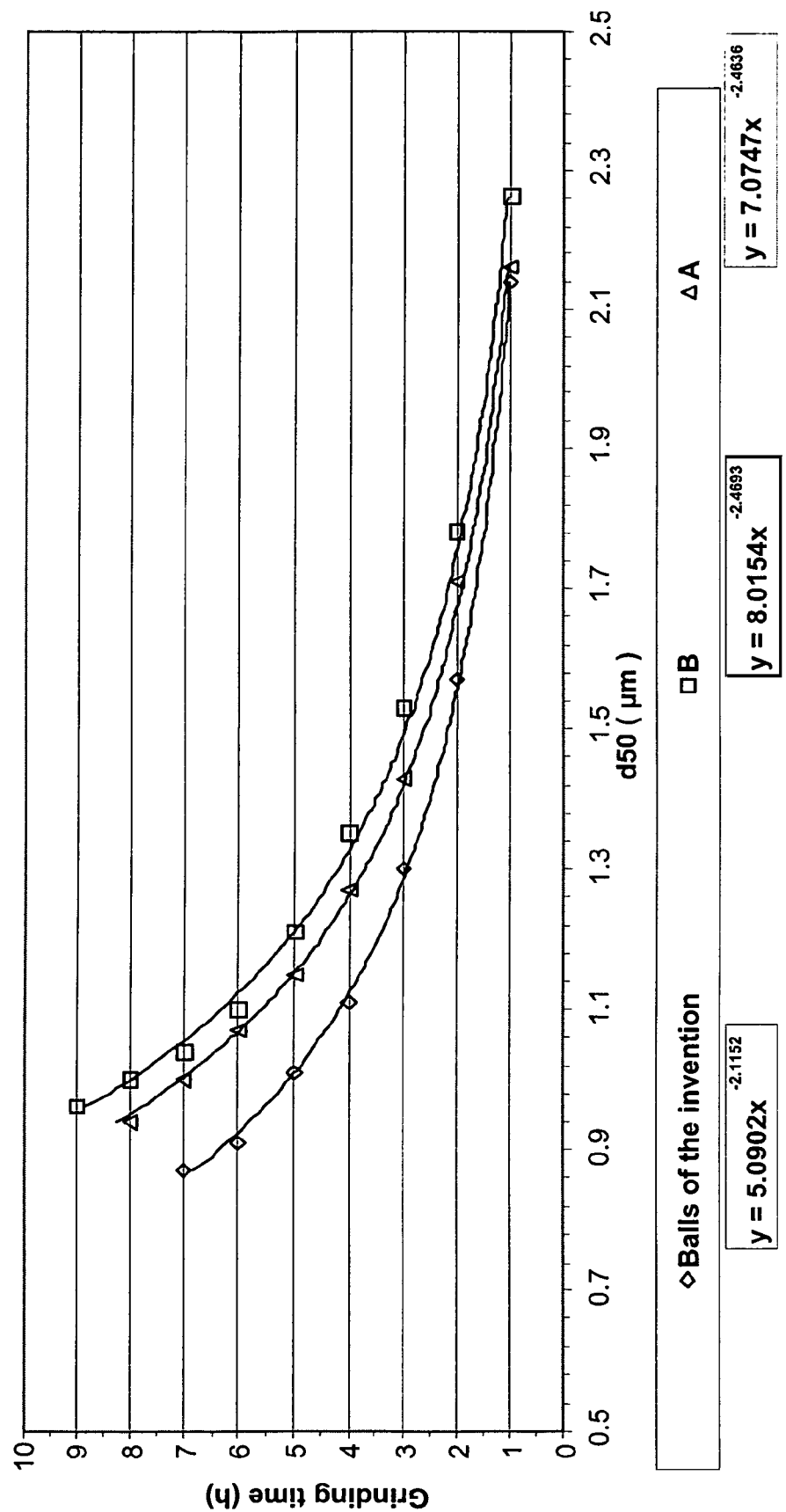
FIG. 3 represents the comparison between the balls of the invention and samples A and B of the prior art according to the grinding time parameter.
Figure 4:
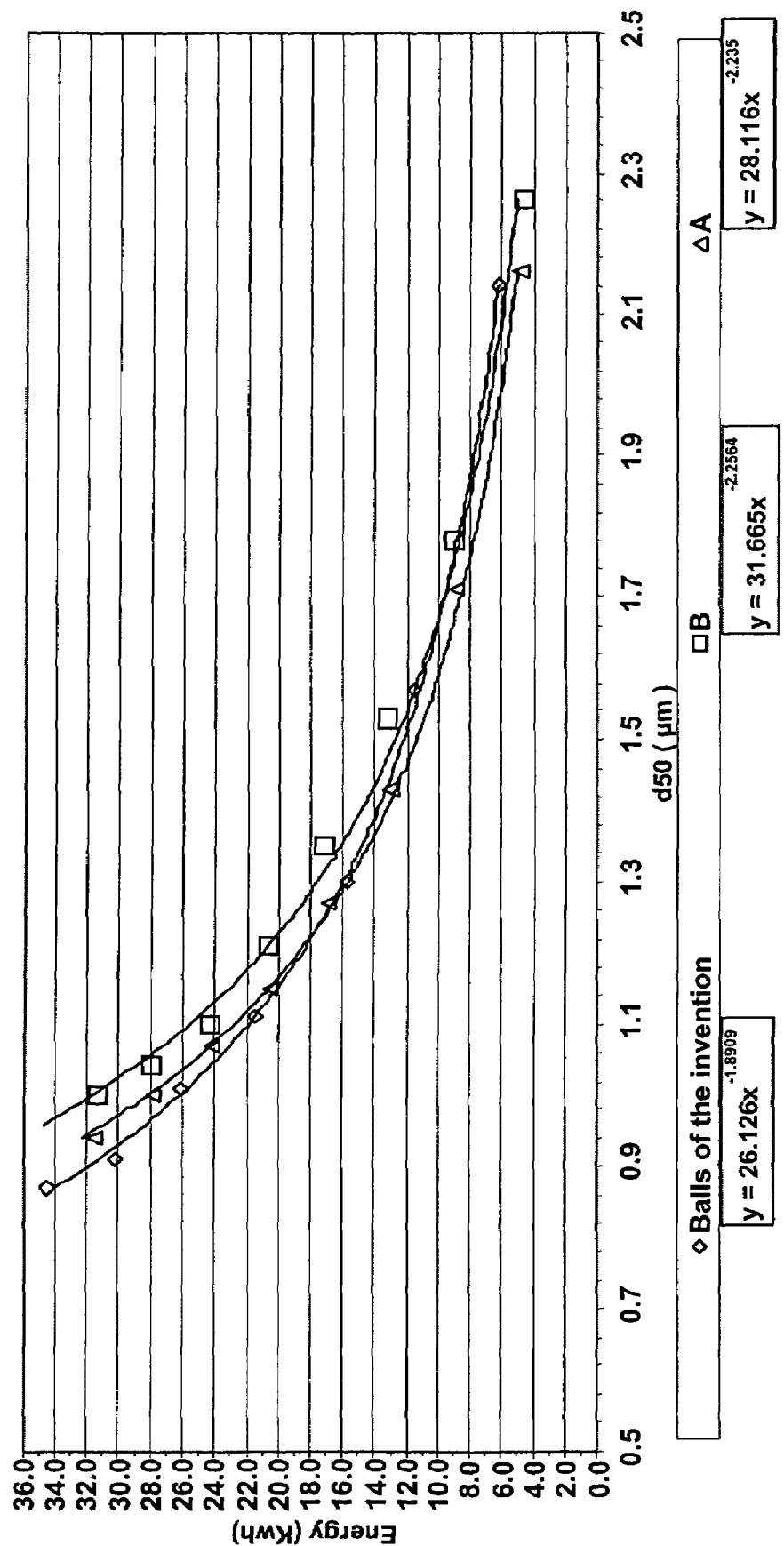
FIG. 4 represents the comparison between the balls of the invention and samples A and B of the prior art according to the energy consumed.

| | Ball of the invention | A | B |
|---|---|---|---|
| Required grinding time (h) | 7 | 8 | 8.5 |
| Final particle size obtained d50 (µm) | 0.87 | 0.94 | 0.98 |
| Consumed energy (Kwh) | 34.80 | 31.50 | 33.40 |
| Wear of the balls (g/Kwh) | 24.83 | 40.91 | 50.61 |
| Wear performance (× more wear) | 1 | 1.65 | 2.04 | b) Grinding Performance: grinding time—energy consumed (see FIGS. 3 and 4).

According to the buddle, for obtaining a slurry with a final particle size d50=1.0 µm, the balls of the invention give the following performance:

|                                      | Ball of the invention | A     | B     |
| ------------------------------------ | --------------------- | ----- | ----- |
| Required grinding time (h)           | 5.09                  | 7.07  | 8.02  |
| Time performance (x more hours)      | 1.00                  | 1.39  | 1.57  |
| Consumed energy (Kwh)                | 26.13                 | 28.12 | 31.67 |
| Energy consumption performance (x more Kwh) | 1.00           | 1.08  | 1.21  |
| Saving index (S)                     | 1                     | 1.8   | 2.5   |

The balls of the invention are more efficient in terms of wear resistance and grinding performance. They also allow a larger production capacity by a lesser use of the attrition mill (see grinding time performance). The combined gains in wear and grinding performances for identical raw material costs give substantial financial gain in favour of the balls of the invention.

2.2 Balls of the Invention Relative to the Alumina-Zirconia Balls (G and H)

According to the test conditions 1.1 a) identical for each quality of tested balls.

Diameter of Tested Balls: 1 mm

Final particle size of the desired slurry: d50+/−0.85 μm.

a) Wear performance

Figure 5:
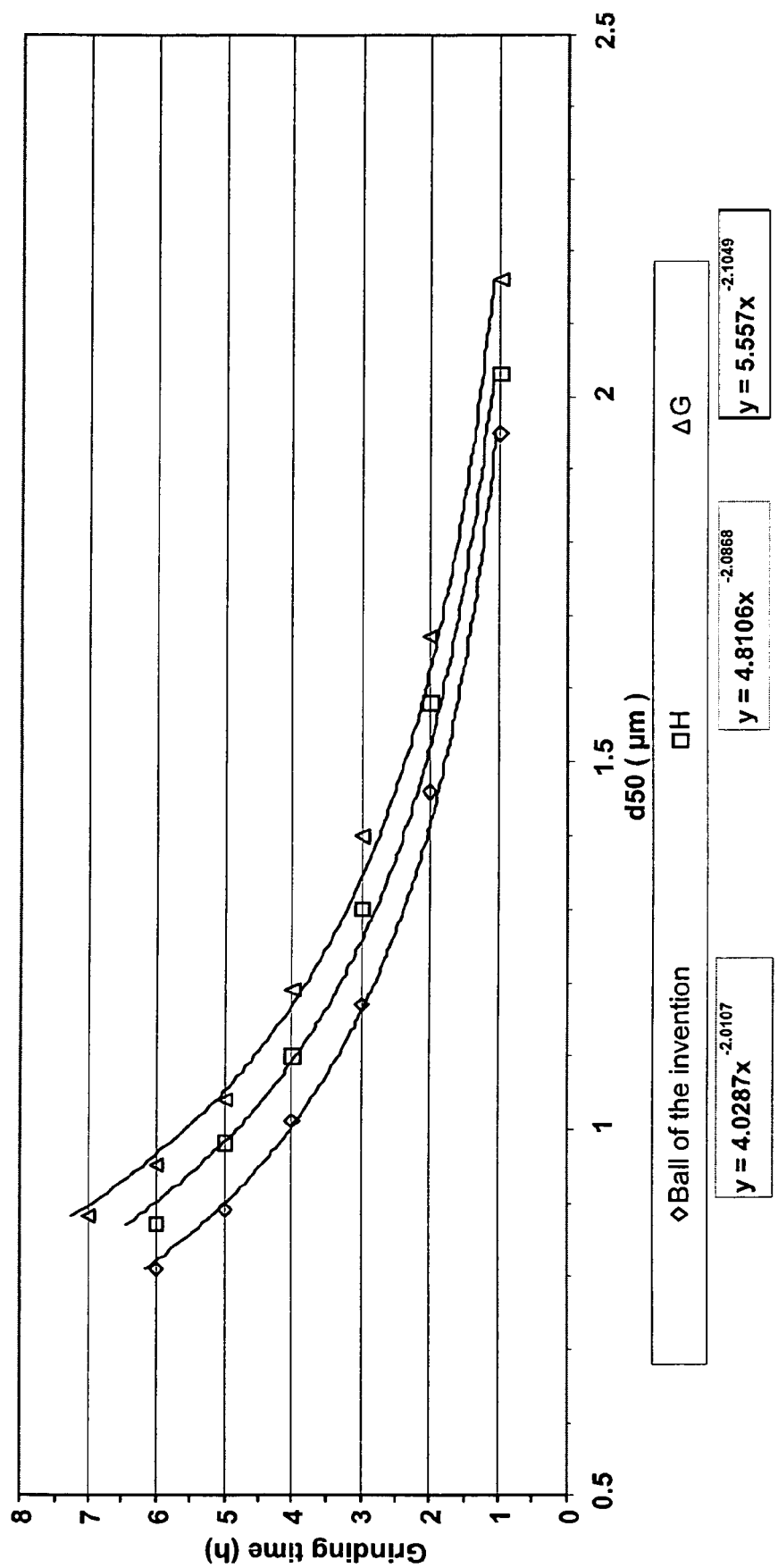
FIG. 5 represents the comparison between the balls of the invention and samples H and G of the prior art according to the grinding time parameter.
Figure 6:
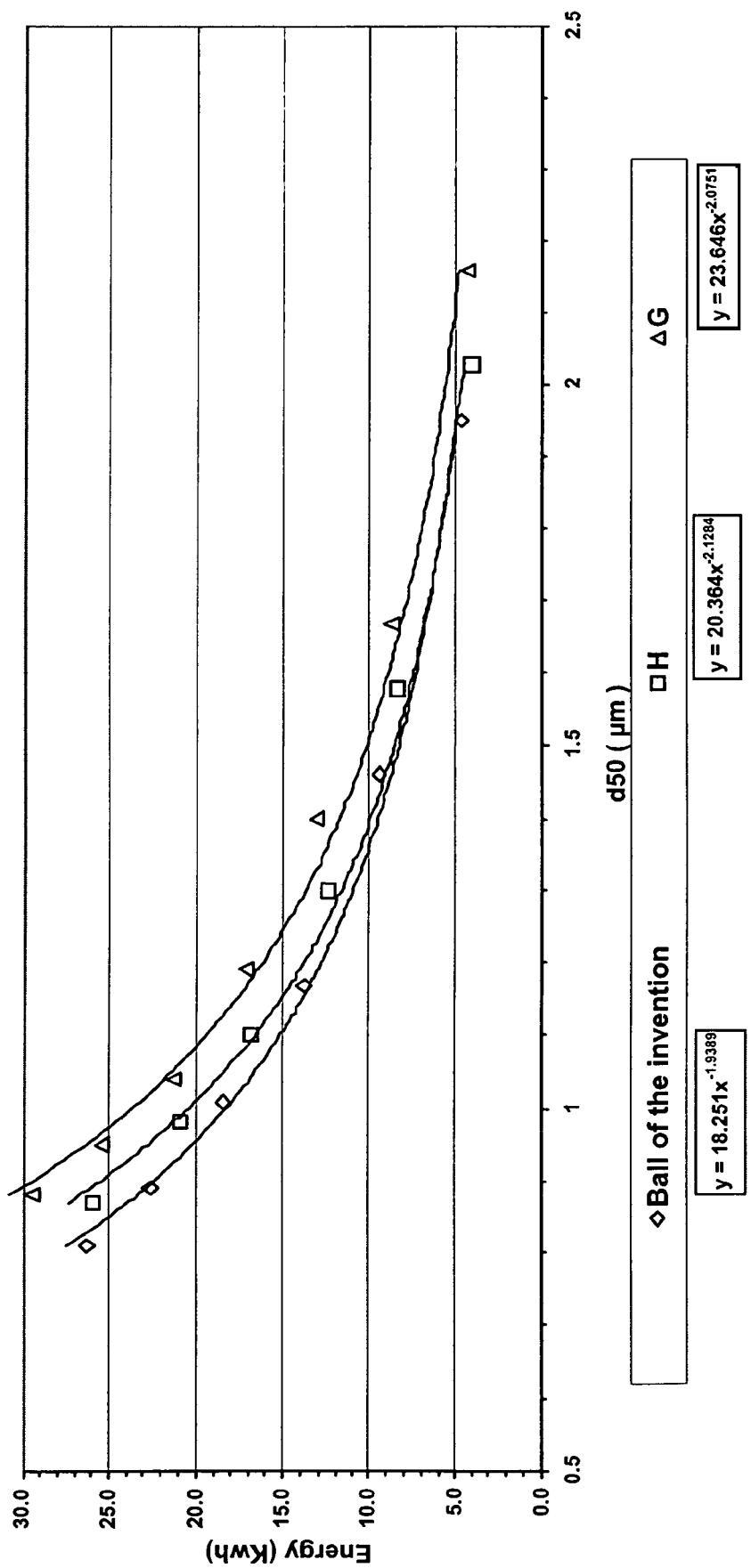
FIG. 6 represents the comparison between the balls of the invention and samples H and G of the prior art according to the energy consumed.

|                                   | Ball of the invention | G     | H     |
| --------------------------------- | --------------------- | ----- | ----- |
| Required grinding time (h)        | 6                     | 7     | 6     |
| Final particle size obtained d50 (μm) | 0.81              | 0.88  | 0.87  |
| Consumed energy (Kwh)             | 27.20                 | 29.70 | 26.20 |
| Wear of the balls (g/Kwh)         | 19.29                 | 20.59 | 14.41 |
| Wear performance (x more wear)    | 1.00                  | 1.07  | 0.75  | b) Grinding performance: grinding time—consumed energy—costs (see FIGS. 5 and 6)

According to the buddle, for obtaining a slurry with a final particle size of d50=1.0 μm, the balls of the invention give the following performance:

|                                      | Ball of the invention | G       | H     |
| ------------------------------------ | --------------------- | ------- | ----- |
| Required grinding time (h)           | 4.03                  | 5.56    | 4.81  |
| Time performance (x more hours)      | 1.00                  | 1.38    | 1.19  |
| Required energy (Kwh)                | 18.25                 | 23.65   | 20.36 |
| Energy consumption performance (x more Kwh) | 1.00           | 1.30    | 1.12  |
| Saving index (S)                     | 1                     | 2.1-2.2 | 2.3   |

The balls of the invention are not clearly distinguishable from the prior art in terms of wear resistance. They however allow a larger production capacity by a lesser use of the attrition mill (see grinding time performance) and a lower energy consumption.

The saving criteria show a twofold saving for the balls of the invention relative to the alumina-zirconia family.

2.3 Balls of the Invention Relative to the Ceried Zirconia Balls (C and D)

Ceried zirconia balls C and D: 80% $ZrO_2$-20% $CeO_2$ in weight.

According to the test conditions 1.1 a), identical for each quality of tested balls.

Diameter of Tested Balls: 2 mm

Final particle size of the desired slurry: d50+/−0.85 μm.

a) Wear performance

Figure 7:
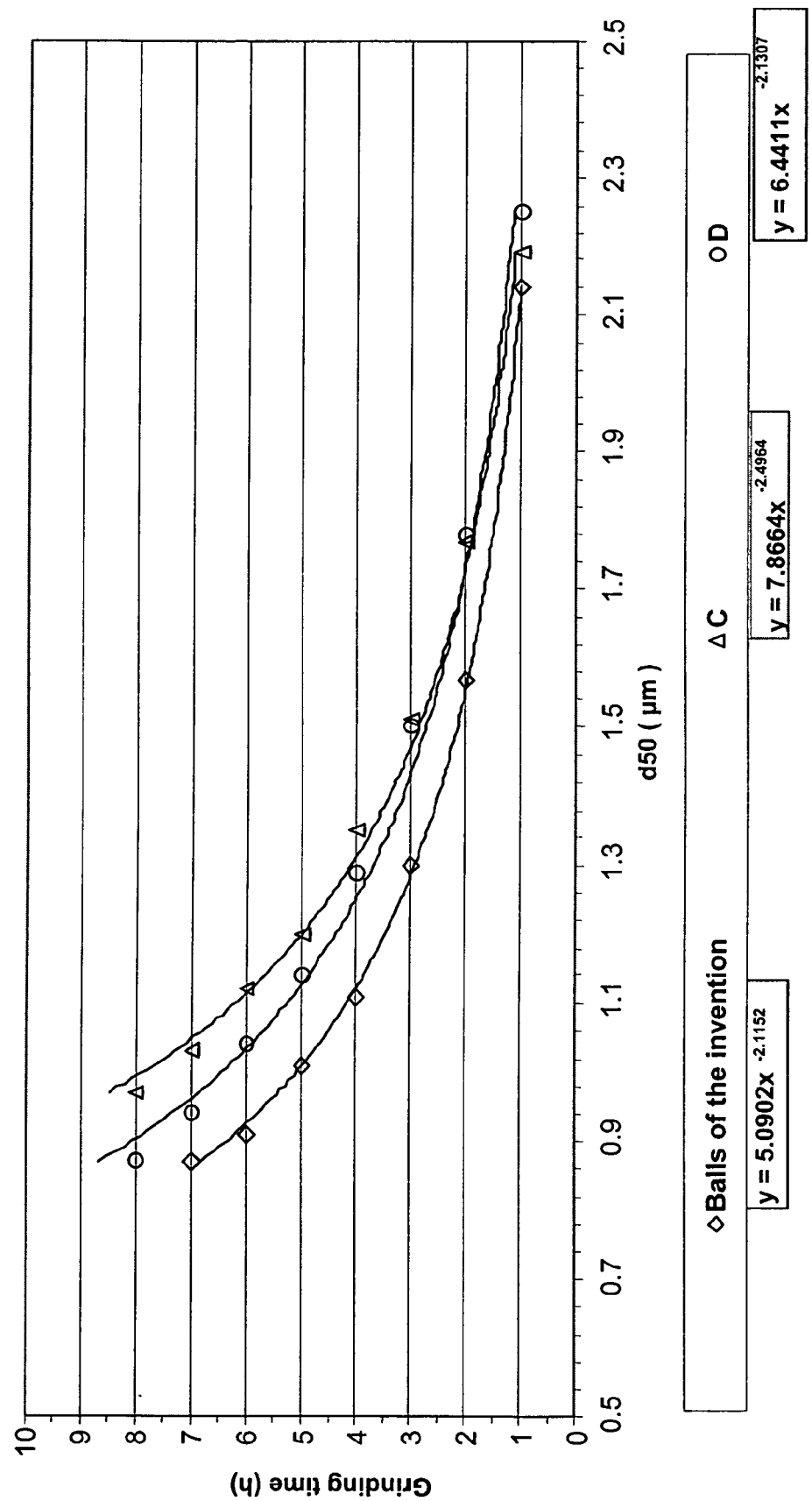
FIG. 7 represents the comparison between the balls of the invention and samples C and D of the prior art according to the grinding time parameter.
Figure 8:
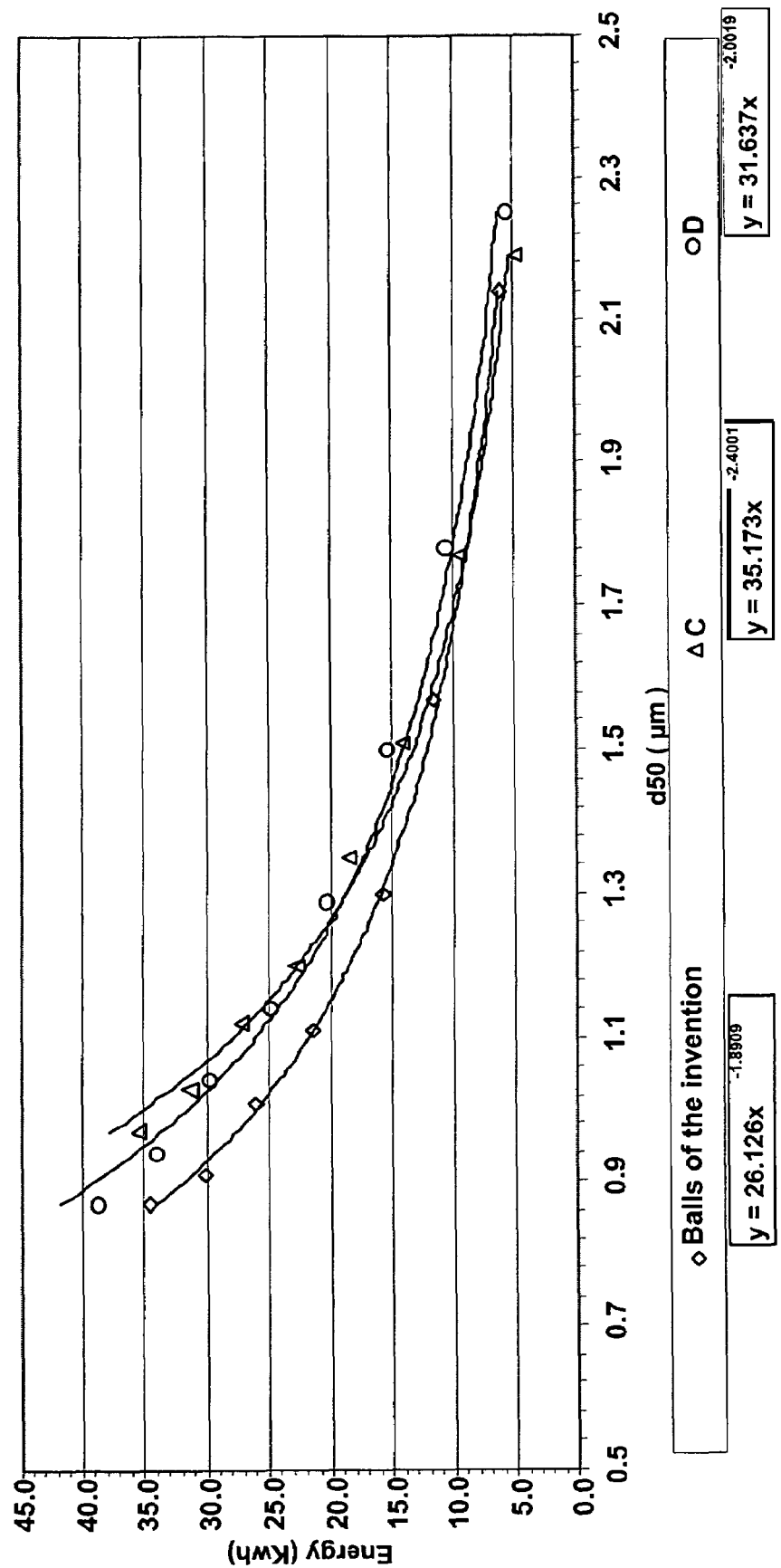
FIG. 8 represents the comparison between the balls of the invention and the samples C and D of the prior art according to the energy consumed parameter.

|                                       | Ball of the invention | C     | D     |
| ------------------------------------- | --------------------- | ----- | ----- |
| Required grinding time (h)            | 7                     | 8     | 8     |
| Final particle size obtained d50 (μm) | 0.87                  | 0.97  | 0.87  |
| Consumed energy (Kwh)                 | 34.80                 | 35.60 | 39.00 |
| Wear of the balls (g/Kwh)             | 24.83                 | 31.90 | 25.91 |
| Wear performance (x more wear)        | 1.00                  | 1.28  | 1.04  | b) Grinding performance: grinding time—consumed energy (see FIGS. 7 and 8).

According to the buddle, for obtaining a slurry with final particle size d50=1.0 μm, the balls of the invention give the following performance:

|                                      | Ball of the invention | C       | D       |
| ------------------------------------ | --------------------- | ------- | ------- |
| Required grinding time (h)           | 5.09                  | 7.87    | 6.44    |
| Time performance (x more hours)      | 1.00                  | 1.55    | 1.27    |
| Required energy (Kwh)                | 26.13                 | 35.17   | 31.64   |
| Energy consumption performance (x more Kwh) | 1.00           | 1.35    | 1.21    |
| Saving index (S)                     | 1                     | 4.2-4.9 | 7.6-8.8 |

The balls of the invention are more efficient in terms of wear resistance and grinding performance. They also allow a larger production capacity by a lesser use of the attrition mill (see grinding time performance). The relative costs of raw materials of samples C and D are largely over those of the balls of the invention.

The combination of all those parameters gives a very important financial gain in favour of the balls of the invention.

2.4 Balls of the Invention Relative to the Zirconia-Silica Balls

Zirconia-silica balls E, produced by electrofusion According to the test conditions 1.1 a) identical for each quality of tested balls.

Diameter of Tested Balls: 2 mm.

Final particle size of the desired slurry: d50+/−0.85 μm.

a) Wear performance

Figure 9:
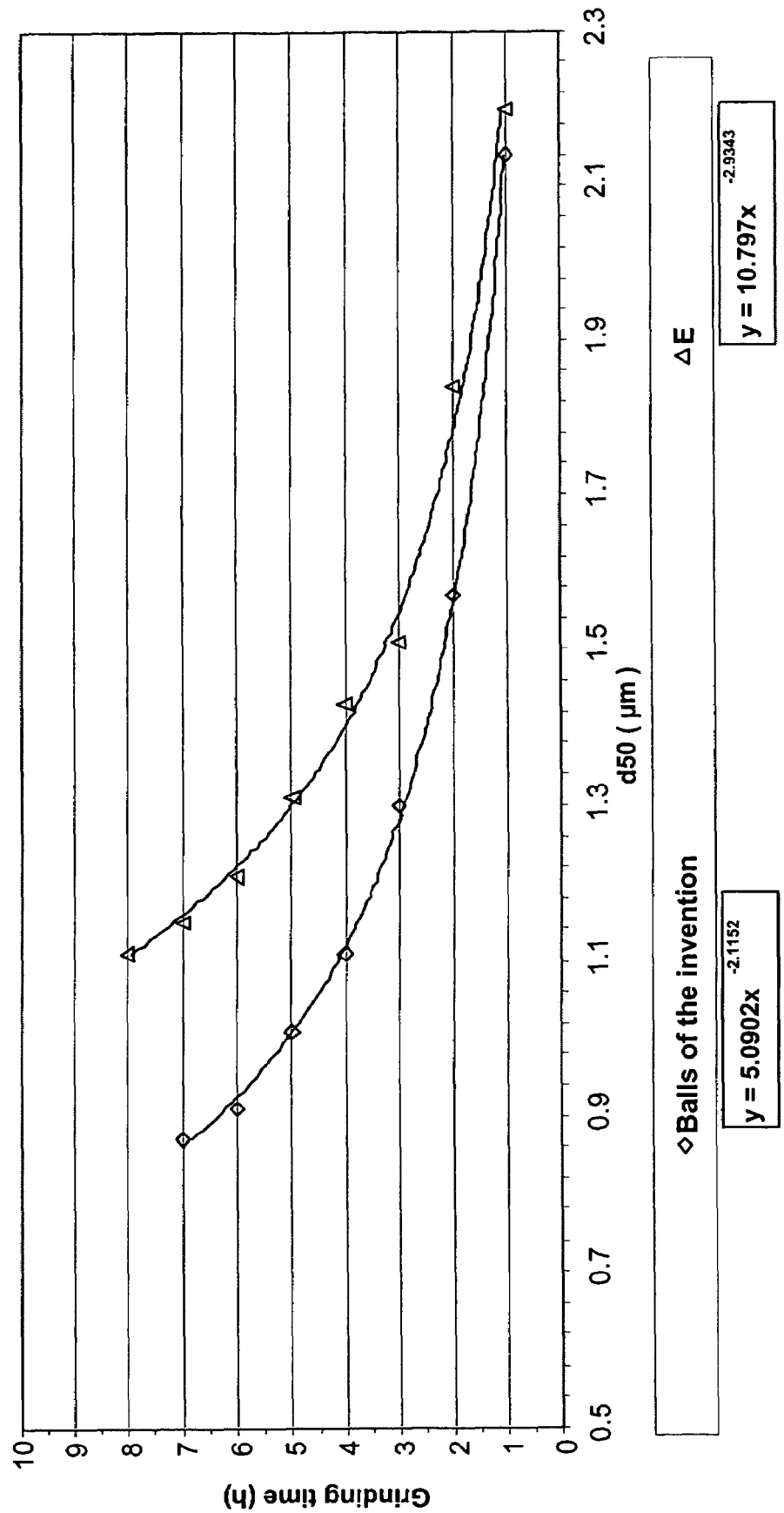
FIG. 9 represents the comparison between the balls of the invention and the sample E of the prior art on the grinding time parameter.
Figure 10:
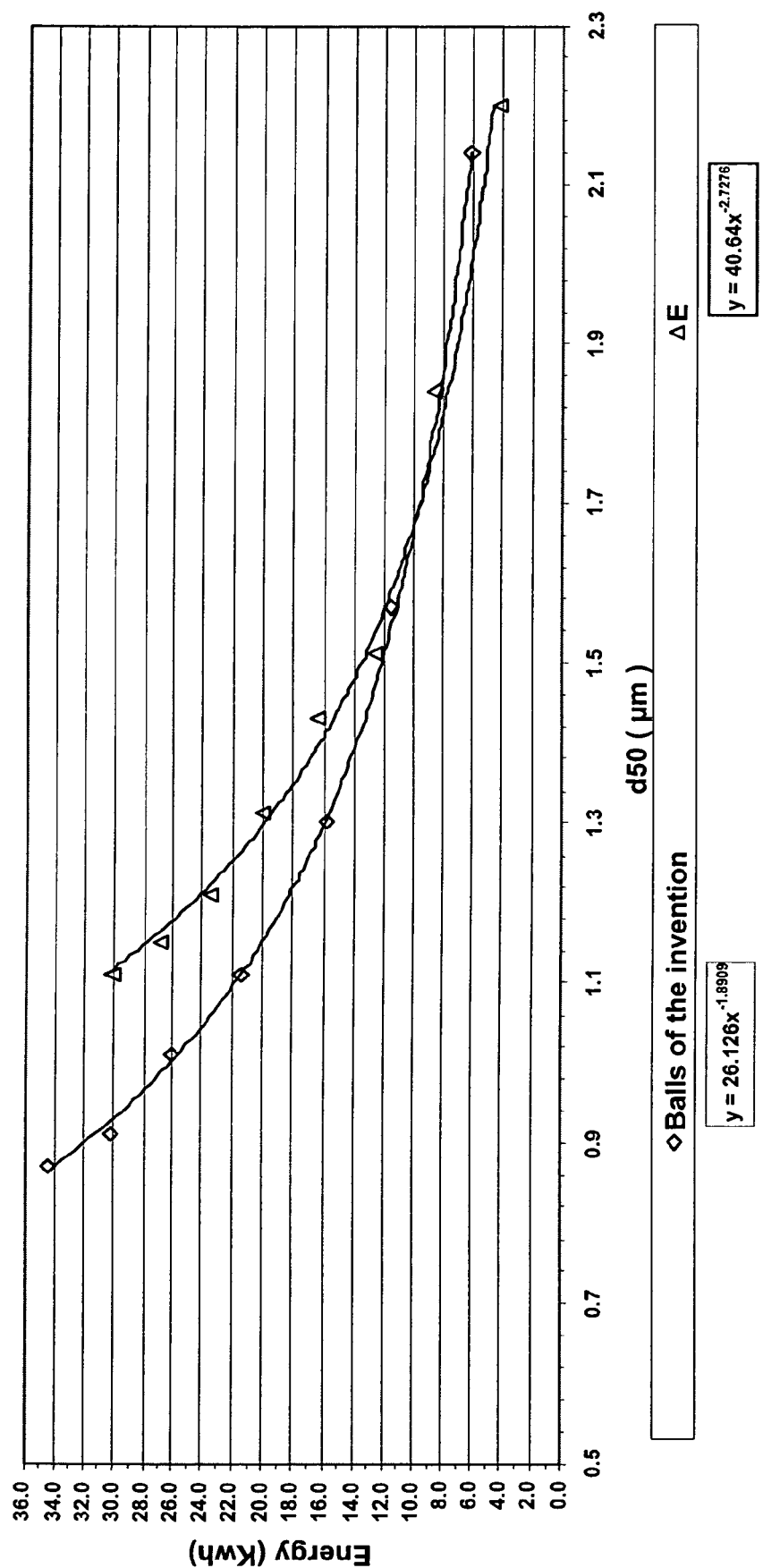
FIG. 10 represents the comparison between the balls of the invention and the sample E of the prior art on the energy consumed.

|                                       | Ball of the invention | E     |
| ------------------------------------- | --------------------- | ----- |
| Required grinding time (h)            | 7                     | 8     |
| Final particle size obtained d50 (μm) | 0.87                  | 1.11  |
| Consumed energy (Kwh)                 | 34.80                 | 39.00 |
| Wear of the balls (g/Kwh)             | 24.83                 | 75.50 |
| Wear performance (x more wear)        | 1.00                  | 3.04  | b) Grinding performance: grinding time—consumed energy (see FIGS. 9 and 10).

According to buddle, for obtaining a slurry with final particle size d50=1.0 μm, the balls of the invention give the following performance:

|  | Ball of the invention | E |
| --- | --- | --- |
| Required grinding time (h) | 5.09 | 10.80 |
| Time performance (× more hours) | 1.0 | 2.12 |
| Required energy (Kwh) | 26.13 | 40.64 |
| Energy consumption performance (× more Kwh) | 1.00 | 1.56 |
| Saving index (S) | 1 | 2.8-3.8 |

The wear and grinding performance of the balls of the invention compensate for the difference in raw material costs in favour of sample E. From a financial point of view, the balls of the invention are again more profitable for the user.

2.5 Balls of the Invention Relative to the Zirconia Balls

Zirconia balls F, stabilised or partially stabilised with yttrium oxide.

According to the test conditions 1.1 b), identical for each quality of tested balls.

Diameter of Tested Balls: 2 mm.

Final particle size of the desired slurry: d50+/−0.85 µm. Wear and grinding performance

|  | Ball of the invention | F |
| --- | --- | --- |
| Required grinding time (h) | 3 | 3 |
| Final particle size obtained d50 (µm) | 0.80 | 0.80 |
| Consumed energy (Kwh) | 13.90 | 14.00 |
| Wear of the balls (g/Kwh) | 19.6 | 5.90 |
| Wear performance (× more wear) | 1.00 | 0.30 |
| Saving index (S) | 1 | 3.03 |

The balls of the invention are not more efficient in term of wear resistance. The grinding performance are also identical.

The very high raw material costs of sample F is however not compensated for by the wear gains and thus, the balls of the invention are more economical for the user.

The invention claimed is:

1. Grinding balls made of fritted ceramic comprising the following components (in % by weight):
   18 to 50% mullite ($3Al_2O_3.2SiO_2$)
   9 to 25% zirconia ($ZrO_2+HfO_2$) stabilised by 0.5 to 3% of rare earth oxides
   25 to 72% alumina ($Al_2O_3$).

2. Grinding balls made of fritted ceramic as in claim 1, wherein said components are mainly obtained from raw materials comprising zircon ($ZrSiO_4$) and alumina ($Al_2O_3$).

3. Grinding balls made of fritted ceramic as in claim 1, wherein said ceramic further comprises 1 to 5% by weight of oxides selected from the group of $Na_2O$, MgO, CaO and BaO.

4. Grinding balls made of fritted ceramic as in claim 1, wherein said zirconia is stabilised by 0.5 to 3% by weight of $Y_2O_3$.

5. Grinding balls made of fritted ceramic as in claim 1, wherein the chemical analysis (X fluorescence, ICP plasma spectrometer) of said balls shows the presence of the following oxides (in % by weight):
   9 to 25% $ZrO_2+HfO_2$,
   0.5 to 3% rare earth oxides,
   5 to 12% $SiO_2$,
   60 to 85% $Al_2O_3$
with a $ZrO_2/SiO_2$ ratio greater than or equal to 2.

6. Grinding balls made of fritted ceramics as in claim 1, wherein their diameter is between 0.1 and 100 mm.

7. Grinding balls made of fritted ceramic as in claim 1, wherein their diameter is between 0.5 and 50 mm.

8. Grinding balls made of fritted ceramic as in claim 1, wherein their diameter is between 0.5 and 10 mm.

9. Method for manufacturing grinding balls comprising the following steps:
   at least one of mixing and grinding raw materials by dry a wet processes in order to form a slurry;
   passing said slurry through a granulation means or process;
   selecting by sieving the balls obtained with the return back to the mixer of the balls of inadequate grain size;
   drying the balls of correct grain size;
   fritting the balls of correct grain size between 1400° C. and 1600° C. followed by a packaging step; and thereby
   Producing grinding balls made of fritted ceramic comprising the following components (in % by weight):
   18 to 50% mullite ($3Al_2O_3.2SiO_2$)
   9 to 25% zirconia ($ZrO_2+HfO_2$) stabilised by 0.5 to 3% of rare earth oxides
   25 to 72% alumina ($Al_2O_3$).

10. Method for manufacturing grinding balls made of fritted ceramic as in claim 9, wherein, during the selection step, the granulation means or process comprise fluidised-bed granulators and granulation discs.

11. Method for manufacturing grinding balls made of fritted ceramic as in claim 10, wherein, during the selection step, on the granulator, water fogging on the grinding balls is adjusted so that the balls coming out of the granulation disc comprise between 18 and 22% of water.

12. Method for manufacturing grinding balls made of fritted ceramic as in claim 9, wherein the granulation means or process comprise gelation methods or injection moulding methods.

13. Method for manufacturing grinding balls made of fritted ceramics as in claim 9, further comprising adding at least one of the components selected from the group of binding agents and organic surfactants.

14. Method for manufacturing grinding balls made of fritted ceramic as in claim 13, wherein binding agents are used said binding agents are selected from the group of polysaccharides, thermoplastic polymers, thermosetting polymers or polymers based on aqueous or organic solvents.

15. Method for manufacturing grinding balls made of fritted ceramics as in claim 13, wherein organic surfactants are used said organic surfactants are chosen from the group of carboxylic acids such as stearic acid or oleic acid and/or polyelectrolytes such as ammonium polymethylacrylate.

* * * * *